United States Patent [19]

Gray

[11] Patent Number: 5,056,373
[45] Date of Patent: Oct. 15, 1991

[54] FLOW RESPONSIVE TRANSMITTER AND INDICATOR

[75] Inventor: Tommy L. Gray, Dallas, Tex.
[73] Assignee: Span Instruments, Inc., Plano, Tex.
[21] Appl. No.: 430,133
[22] Filed: Nov. 1, 1989

Related U.S. Application Data

[62] Division of Ser. No. 5,830, Jan. 21, 1987, Pat. No. 4,898,036.

[51] Int. Cl.⁵ .............................................. G01F 1/28
[52] U.S. Cl. ............................ 73/861.71; 73/861.75
[58] Field of Search ........... 73/861.71, 861.74, 861.75, 73/861.76

[56] References Cited

U.S. PATENT DOCUMENTS

| | | | |
|---|---|---|---|
| 1,903,713 | 4/1933 | Baule | 73/861.74 |
| 2,316,255 | 4/1943 | Knobel et al. | 73/861.75 |
| 3,147,620 | 9/1964 | Stapler | 73/861.74 |
| 3,188,421 | 6/1965 | Rowell | 73/861.75 |
| 3,380,299 | 4/1968 | Seymour | 73/861.74 |
| 3,681,983 | 8/1972 | Alexander . | |
| 3,691,843 | 9/1972 | Gorgens et al. . | |
| 3,855,458 | 12/1974 | Motter et al. . | |
| 4,353,118 | 10/1982 | Heimgartner et al. . | |
| 4,569,233 | 2/1986 | Rosaen | 73/861.71 |
| 4,625,565 | 12/1986 | Wada et al. | 73/861.74 |
| 4,788,869 | 12/1988 | Li | 73/861.71 |

Primary Examiner—Herbert Goldstein
Attorney, Agent, or Firm—Harold E. Meier

[57] ABSTRACT

In the measurement of fluid flow, the generation of a linearly varying signal and a pulsation free display are provided by a flow responsive indicator having digit displays for numerically indicating the rate of measured flow. The digit displays are driven in accordance with a measured flow signal applied to circuitry for generating an updated display signal from a previous display signal and the current value of the measured flow signal. This analog updated display signal is converted into a digital signal for driving circuitry connected to each of the digit displays. The measured flow signal applied to the indicator is generated at a flow transmitter including a transducer, such as a Hall effect element. This transducer generates a signal varying with flow in response to movement of a vane mounted in proximity thereto. To provide a signal varying linearly with flow rate, a flexible element extends into the fluid stream and by action thereof displaces the vane with reference to the transducer to generate the desired linearly varying signal.

3 Claims, 5 Drawing Sheets

FLOW RESPONSIVE TRANSMITTER AND INDICATOR

This is a division of application Ser. No. 5,830, filed Jan. 21, 1987, now U.S. Pat. No. 4,898,036.

TECHNICAL FIELD

This invention relates to the measurement and display indication of a fluid flow, and more particularly, to the measurement and display indication of turbulent and pulsating fluid flow.

BACKGROUND ART

Heretofore, it has been recognized that in the measurement of fluid flow, laminar flow conditions are preferred to achieve more accurate flow measurement. It has also long been recognized that a continuing problem in measurement of fluid flow is establishing a linear relationship between the measured flow and a signal varying with the flow. Various techniques have been employed to create laminar flow in a turbulent flow condition and to linearize the relationship between a signal varying with measured flow and the rate of flow passing a transducer. The various techniques heretofore used in the measurement of the rate of flow of a fluid have been acceptable so long as the flow conditions are reasonably well defined.

Where the conditions of the fluid flow to be measured are not well defined, there has developed a need for a transmitter and a flow indicator that has an acceptable accuracy factor. An example of a fluid system wherein the flow cannot be well defined and includes pulsating flow conditions are vehicle mounted systems. For example, a fluid system mounted on a truck chasis by necessity results in only a few very short straight runs of pipe that have been defined as the most desirable location for a fluid flow transducer. Thus, fluid systems on a vehicle chasis usually require the measurement of flow in a turbulent flow condition. Furthermore, the fluid discharge of such vehicle mounted systems is also pulsating which compounds the problem of producing an accurate flow measurement.

When measuring flow in a large fixed installation, with a reasonably long productive life, the cost of the fluid measuring transducer and indicator is usually not considered to be a significant part of the total system cost. However, when measuring fluid flow in a vehicle mounted system, which may have only a relatively short productive life span, the cost of the fluid flow measuring transducer and indicator becomes a more significant factor. Thus, while some of the previously used techniques for measurement of flow are available for the vehicle mounted system, the cost of such techniques are prohibitive and out of proportion to the overall cost of the system. Any fluid flow measuring system for a vehicle mounted flow system requires a careful analysis of the costs involved.

SUMMARY OF THE INVENTION

In accordance with the present invention, there is provided a flow responsive indicator including means for generating a signal varying with a measured flow. This flow signal along with a previously generated display signal are input to a means for combining that is part of a means for generating an updated display signal. Thus, the updated display signal is generated from a combination of a previously generated display signal and the flow signal. At timed intervals, a controller connects in sequence the previous display signal to the means for combining, the flow signal to the means to combining, and the updated display signal to a flow display indicator thereby providing a digital display of the measured flow.

Further, in accordance with the present invention, the means for generating the updated display signal includes a first means for storing the previous display signal, a second means for storing the flow signal each connected to the means for combining the stored previous display signal with the stored flow signal to generate the updated display signal.

Also in accordance with the present invention there is provided a flow responsive transmitter having a housing within which is mounted a vane positionable in response to the rate of flow in a fluid flow stream. Mounted within the housing is a transducer responsive to movement of the vane to generate a measured flow signal to a flow responsive indicator. Connected to the vane and extending into the flow stream is a flexible element that tends to smooth out turbulent flow and positions the vane with reference to the transducer to cause the measured flow signal to vary linearly with the rate of flow. In a preferred embodiment the flexible element connected to the vane comprises a tightly coiled spring having the necessary characteristics to move the vane with reference to the transducer to cause the measured flow signal to vary linearly.

BRIEF DESCRIPTION OF THE DRAWINGS

For a more complete understanding of the present invention and the advantages thereof, reference is now made to the following detailed description taken in conjunction with the accompanying drawings.

Referring to the drawings.

DETAILED DESCRIPTION

Figure 1:
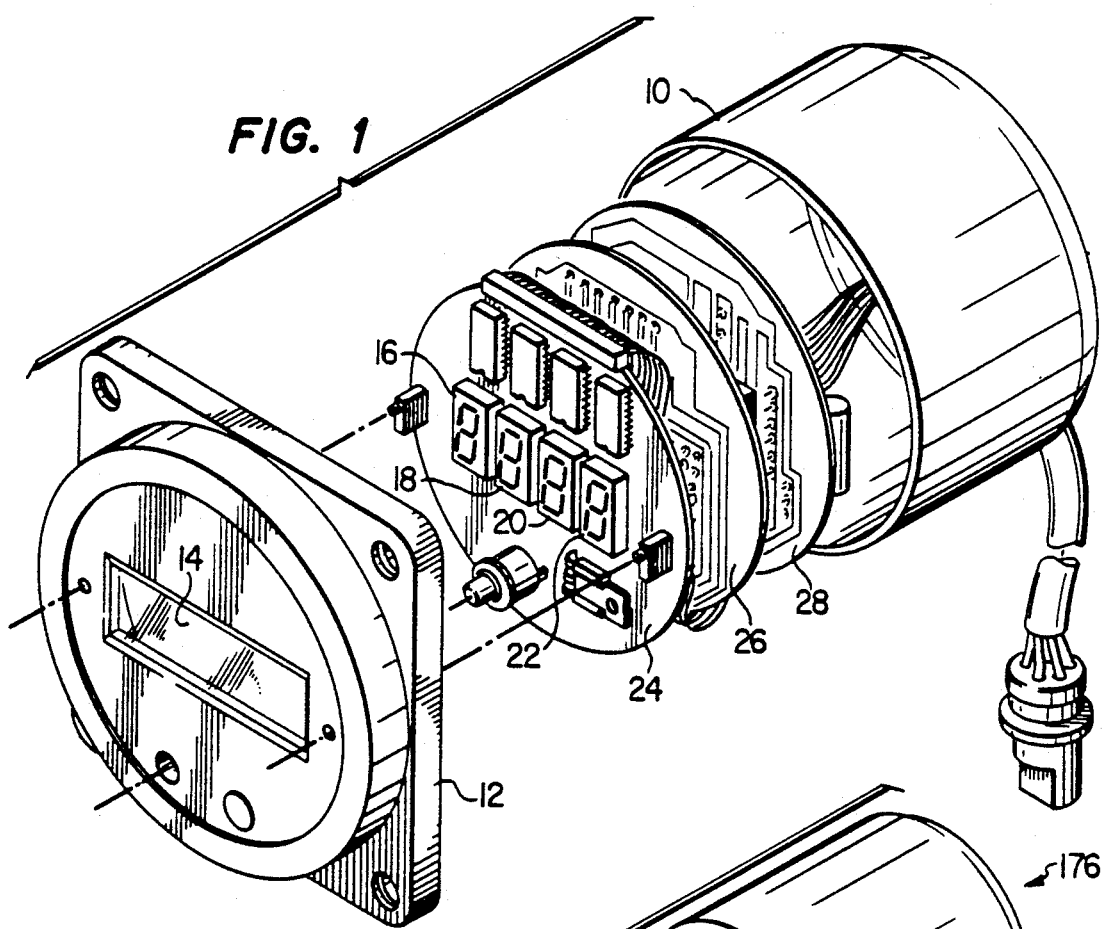
FIG. 1 is a pictorial view of a flow responsive digital indicator exploded to show circuit boards supporting the necessary electronic elements to respond to a flow measurement signal and driving digital indicators.

Referring to FIG. 1, there is shown the flow responsive indicator of the present invention including a housing 10 and a front panel 12 having a viewing window 14 in which appears a four digit display for numerically indicating the rate of flow of a measured fluid. The digital displays 16, 18, 20 and 22 are shown mounted on a circuit board 24, one of three circuit boards that support the circuitry for driving the digital displays in accordance with an applied signal representing measured flow. Also illustrated is a circuit board 26 that contains circuit components that respond to the signal representing measured flow and generating at timed intervals an updated display signal applied to a circuit board 28. The circuit board 28 contains circuit components responding to the updated display signal for converting these signals into a digital format for driving the circuitry of the circuit board 24. The circuit boards 24, 26 and 28 are assembled in a parallel arrangement into the housing 10 such that the displays 16, 18, 20 and 22 are positioned in the viewing window 14.

Figure 5:
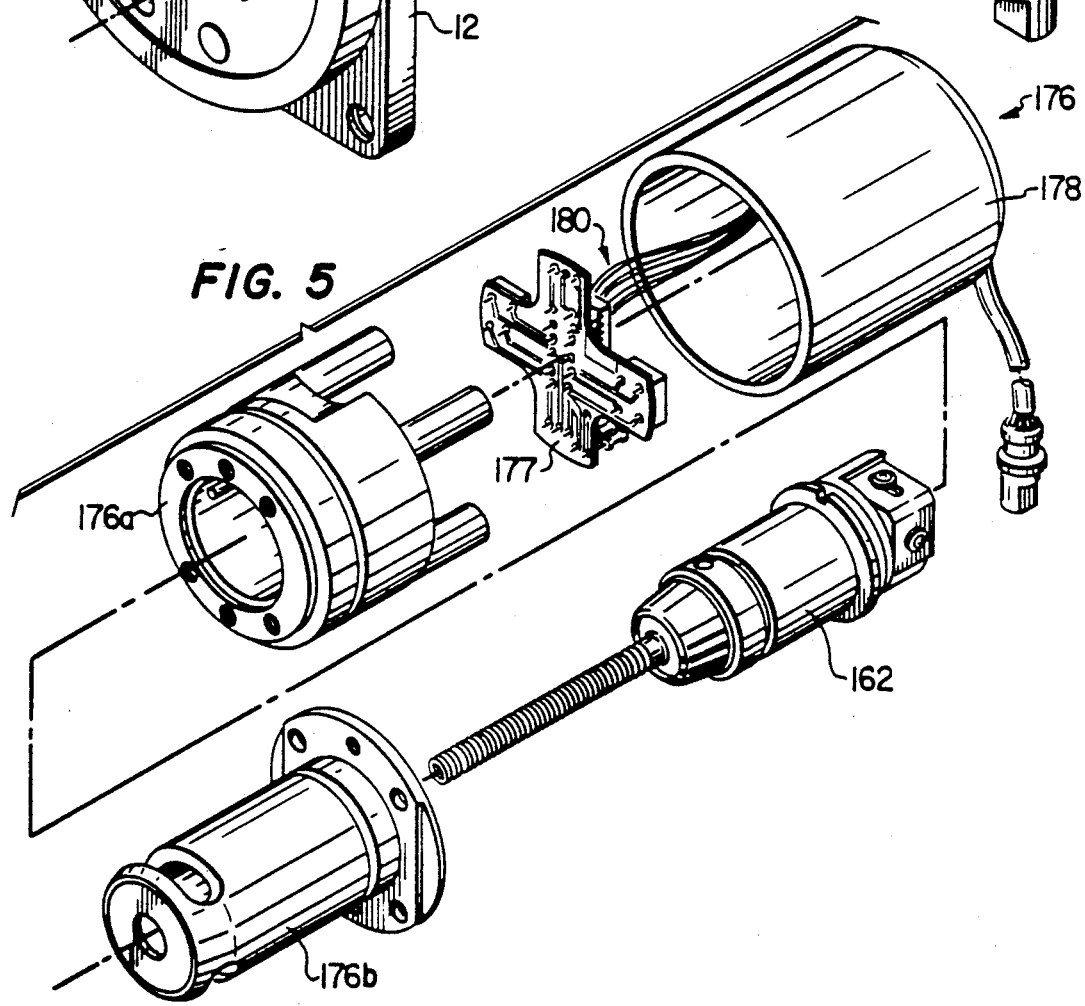
FIG. 5 is a pictorial view of a flow responsive transmitter, partially exploded, for generating a signal representing flow measurement.
Figure 2:
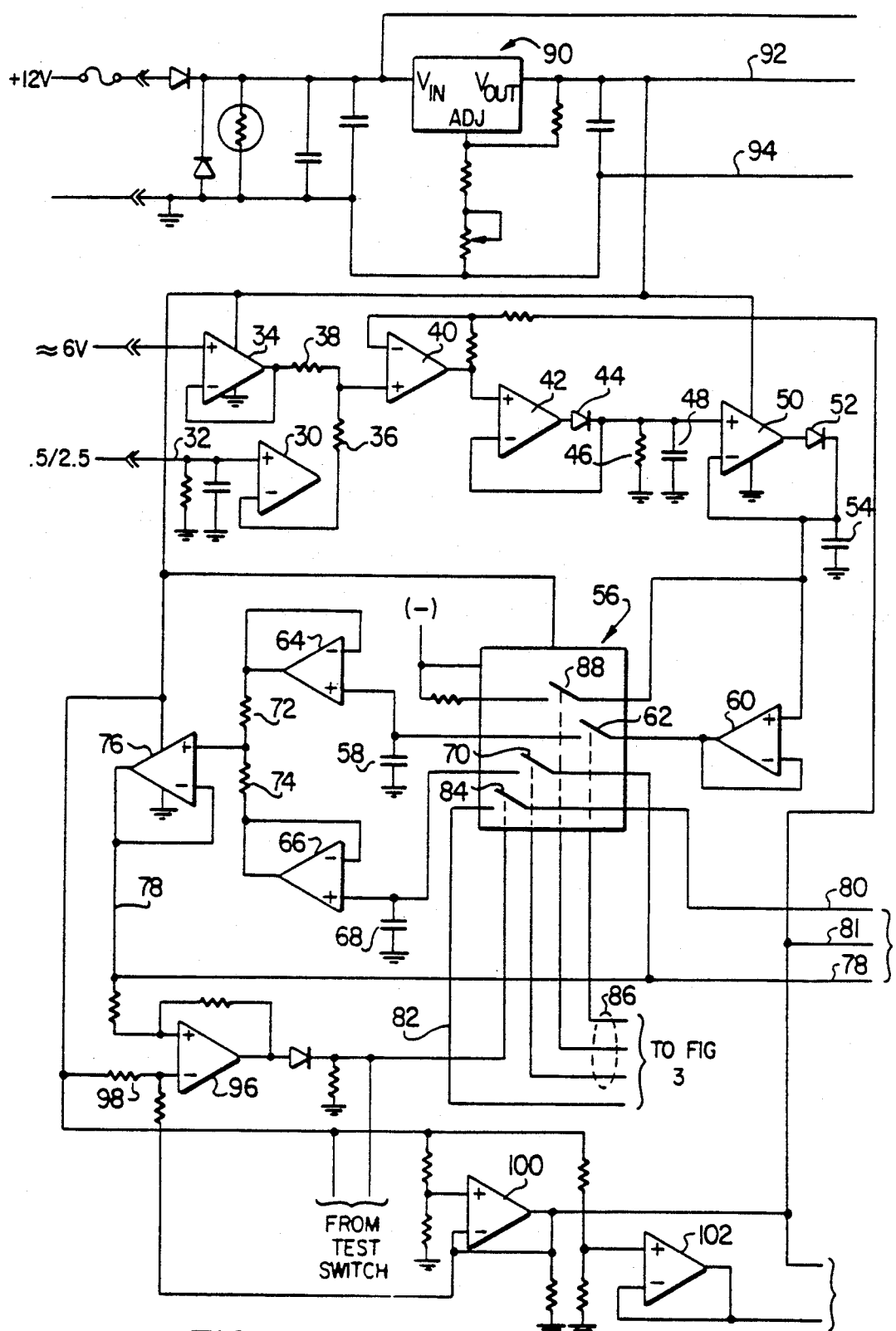
FIG. 2 is a schematic diagram of one of three circuit boards of FIG. 1 for responding to a flow measurement signal.

Referring to FIG. 2, there is schematically shown the circuitry of the circuit board 26 including an amplifier 30 having an input line 32 connected to receive a signal varying with measured flow from a flow transmitter such as illustrated in FIG. 5, to be described. The amplifier 30 is part of a circuit responding to the flow signal to generate an updated display signal. Also included in the circuit of FIG. 2 is an amplifier 34 receiving an input signal from a zero adjusting network mounted on the circuit board 24 and schematically illustrated in FIG. 4, to be described. Output signals from the amplifiers 30 and 34 are applied through resistors 36 and 38, respectively, to be summed at the input terminal of an amplifier 40. Thus, the output of the amplifier 40 varies with the signal representing measured flow applied to the amplifier 30 and adjusted for zero flow rate at the output of the amplifier 34.

An output of the amplifier 40 is applied to an amplifier 42 generating an output applied through a diode 44 to a filter network comprising a resistor 46 in parallel with a capacitor 48 The output of the filter network is applied to one input of an amplifier 50 as part of a sample and hold circuit consisting of a diode 52 and a storage capacitor 54. A voltage appearing across the capacitor 54 is a flow signal varying with linearly measured flow.

At timed intervals controlled by a sequence controller 56, the flow signal across the capacitor 54 is applied to a storage capacitor 58 through an amplifier 60. Specifically, the output of the amplifier 60 is applied through a switch 62 as part of the sequence controller 56. Thus, by operation of the switch 62, the flow signal across the capacitor 54 is transferred to and stored across the capacitor 58. This flow signal, appearing as a voltage across the capacitor 58, is applied to one input of an amplifier 64 as part of a circuit for generating an updated display signal to an analog-to-digital converter of the circuit board 28. Also included as a part of the circuit for generating the updated display signal is an amplifier 66 having an input connected to a storage capacitor 68 that receives at timed intervals, through the sequence controller 56 the previously generated updated display signal. The storage capacitor 68 is charged through a switch 70 as part of the sequence controller 56.

Output signals from the amplifiers 64 and 66 are applied through resistors 72 and 74, respectively, to one input of an amplifier 76. By operation of the amplifiers 64 and 66 and the resistors 72 and 74, along with the amplifier 76, the flow signal stored across the capacitor 58 and the previous display signal stored across the capacitor 68 are summed into the updated display signal on a line 78 from the amplifier 76.

The output of the amplifier 76, as the updated display signal is applied to a range adjust network on the circuit board 24 and will be described with reference to FIG. 4. The range adjusted signal from the circuit board 24 is applied to the sequence controller 56 on a line 80 and at timed intervals is applied to a line 82 by means of a switch 84 as part of the sequence controller.

In operation, the circuit of FIG. 2 responds to a signal varying with measured flow and generates an updated display signal on the line 82. Sequence signals are applied to lines 86 to operate the switches of the sequence controller 56 including a switch 88 connected to the storage capacitor 54. At sequence clock zero, a clock pulse actuates the switch 70 into a closed position to apply the previously updated display signal to the storage capacitor 68. At the termination of this clock pulse, the switch 70 is opened and following a preset time interval, a clock pulse is applied to the sequence controller 56 to close the switch 88. This discharges the flow signal stored across the storage capacitor 54 to zero and after a preset time interval the switch 88 reopens and the flow signal again builds up across the storage capacitor 54. Note, the flow signal now stored across the capacitor 54 is the most current value of the signal applied to the amplifier 30 that varies with measured flow. At a timed interval after opening the switch 88, a sequence clock pulse is applied to the controller 56 closing the switch 62 to apply the most current value of the flow signal across the capacitor 54 to the storage capacitor 58. Upon timing out of this third sequence clock pulse, the switch 62 is opened and at this point in the sequence both the capacitors 58 and 68 have current stored signal values. These current values are then summed to generate the updated display signal on the line 78, which after range adjustment, is re-routed to the circuit of FIG. 2 on the line 80. At a preset time interval later, the switch 84 is closed and the updated display signal is applied by means of the line 82 to the analog-to-digital circuit on the circuit board 28. Included as a part of the circuit on the board 28 is the clock pulse generator to be described.

The circuitry of FIG. 2 also includes a regulated power supply 90 of conventional design consisting of interconnected diodes, resistors, capacitors and resistor elements. Further description of this power supply is not considered to benefit an understanding of the invention.

The output of the power supply 90 is generated on a line 92 and provides a regulated voltage to various components on the circuit boards 24, 26 and 28 including those circuit elements most recently described for generating an updated display signal. Also illustrated as part of the power supply 90 is a line 94 that functions as circuit ground for various components of the circuit boards 24, 26 and 28.

In addition to the circuit components previously described, the regulated voltage on the line 92 is applied to an amplifier 96 that receives a second input from the output of the amplifier 76, that is, the updated display signal. The output of the power supply 90 is applied to the amplifier 96 through an input resistor 98 and is identified as an analog ground for the various components of the circuits of the boards 24, 26 and 28. An output of the amplifier 96 is applied to the sequence controller 56 for controlling the operation of the switch 84. The switch 84 is also controlled from a test switch as part of the circuit board 24, to be described.

The analog ground at the input of the amplifier 96 is also applied to an input of an amplifier 100 having a second input from the power supply 90. Amplifier 100 generates an offset analog ground signal. This offset ground is applied to the circuit components of the circuit board 28.

To complete the description of the circuit of FIG. 2, an amplifier 102 is connected to the power supply 90 for generating a reference DC voltage applied to the analog to digital converter of the circuit board 28.

Figure 3:
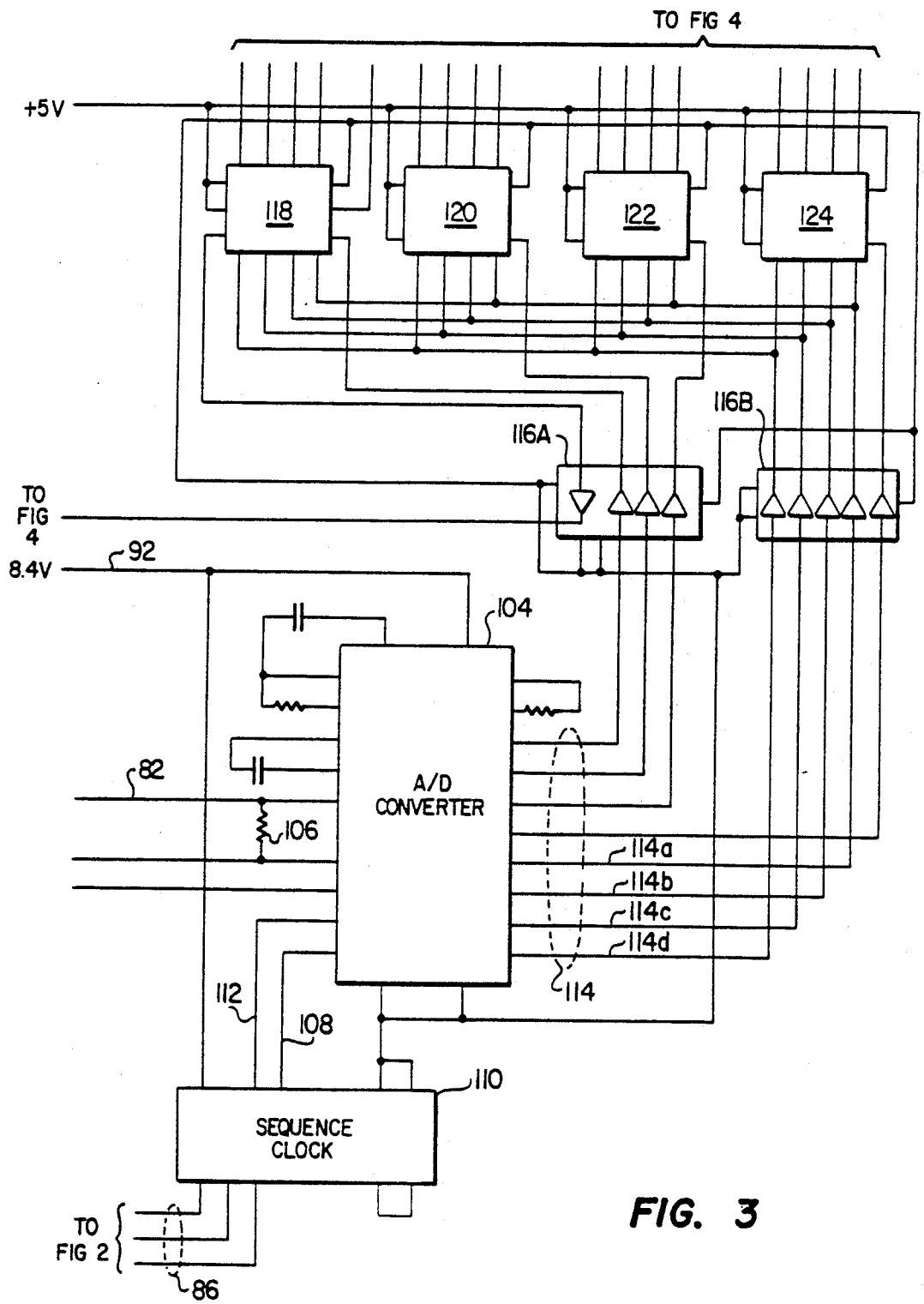
FIG. 3 is a schematic diagram of a second of the three circuit of boards of FIG. 1 for conversion of the output of the circuit of FIG. 2 into digital display drive signals.

Referring to FIG. 3, there is shown a schematic diagram of circuitry responsive to the updated display signal on the line 82 from the sequence controller 56. An updated display signal on the line 82 is applied to an analog-to-digital converter 104 at the terminal $V_x$. Also connected to the line 82 is a input resistor 106 tied to analog ground at the output of the amplifier 100. A drive voltage for the analog-to-digital converter 104 is applied on line 92 from the regulated supply 90.

The analog-to-digital converter 104 receives the updated display signal on line 82 at timed intervals as determined by a sequence clock pulse provided on a line 108 at an output of a sequence clock 110. The sequence clock 110 also provides the sequence clock pulses to the sequence controller 56 over the lines 86. Operation of the analog-to-digital converter is clocked by an output of the sequence clock 110 on a line 112.

An output of the analog-to-digital converter 104 is a digital representation of the updated display signal generated in the circuitry of FIG. 2. This digital signal is generated an output lines 114 that are individually applied to either an amplifier network 116a or an amplifier network 116b. The function of the amplifier networks 116a and 116b is to amplify the level of the digital signal from the analog-to-digital converter 104 to drive display circuitry to be described. Each of the networks 116a and 116b consists of a buffer amplifier for each of the output lines of the analog-to-digital converter 104. These buffer amplifiers have outputs connected individually to one of an array of latch circuits 118, 120, 122 and 124. Also, the binary code from the analog-to-digital converter 104 on the lines 114a, 114b, 114c and 114d are applied through buffer amplifiers of the network 116b to drive all of the latch circuits, 118, 120, 122 and 124. The output of the individual latch circuits is a binary code for driving a digit display as illustrated in FIG. 4.

Figure 4:
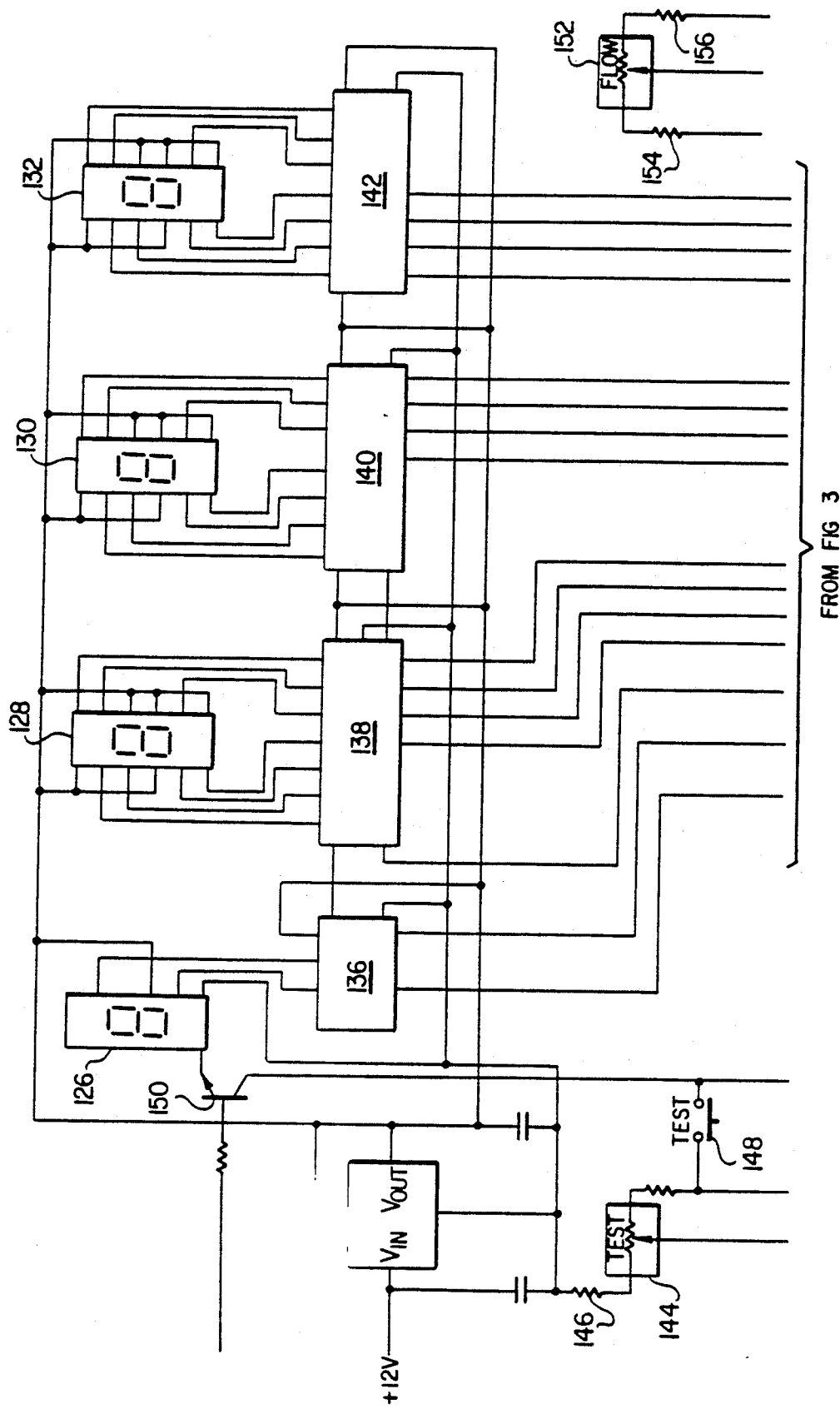
FIG. 4 is a schematic diagram of the third circuit board of FIG. 1 having the digital display elements responding to the drive signals for the circuit of FIG. 3.

Referring to FIG. 4, there is shown digit displays, 126, 128, 130 and 132 and associated drive circuitry. This drive circuitry includes decoder drivers 136, 138, 140 and 142 for each of the digit displays. The driver decoder 138 is connected to the latch circuit 118, the driver decoder 138 connects to the latch circuit 120, the driver decoder 140 connected to the latch circuit 122 and the driver decoder 142 connects to the latch circuit 124. Also connected to each of the driver decoders and the digit displays are various circuit elements for driving each of the displays to produce a numerical indication of the flow signal input to the amplifier 30 of FIG. 2.

Also shown in FIG. 4, which is the circuit board 24 of FIG. 1, is a zero adjust network including a potentiometer 144 in series with a resistor 146 with the center tap of the potentiometer connected to the input of the amplifier 34 of FIG. 2. Also shown in FIG. 4 is a test pushbutton 148 for turning on a transistor 150 to test the digit displays 126, 128, 130 and 132. There is further included in FIG. 4 a flow, or range, adjust potentiometer 152 in series with resistors 154 and 156. This network is connected to the lines 78, 80 and 81 of FIG. 2.

The circuitry of FIGS. 2 through 4 responds to a signal varying with measured flow to provide a digital display in the instrument illustrated in FIG. 1. The measured flow signal is sampled and stored and subsequently combined with a previous display signal to generate an updated display signal. At timed intervals, the sequence controller sequences the operation of the circuit producing a stabilized updated display signal in an analog format that is converted into a digital signal by an analog-to-digital converter. The digital representation of the updated display signal drives a four digit display to numerically indicate a rate of flow as represented by the signal varying with measured flow. By operation of the display as described, oscillating flow signals as caused by turbulent flow are smoothed out thus providing a more steady numerical display.

Figure 6:
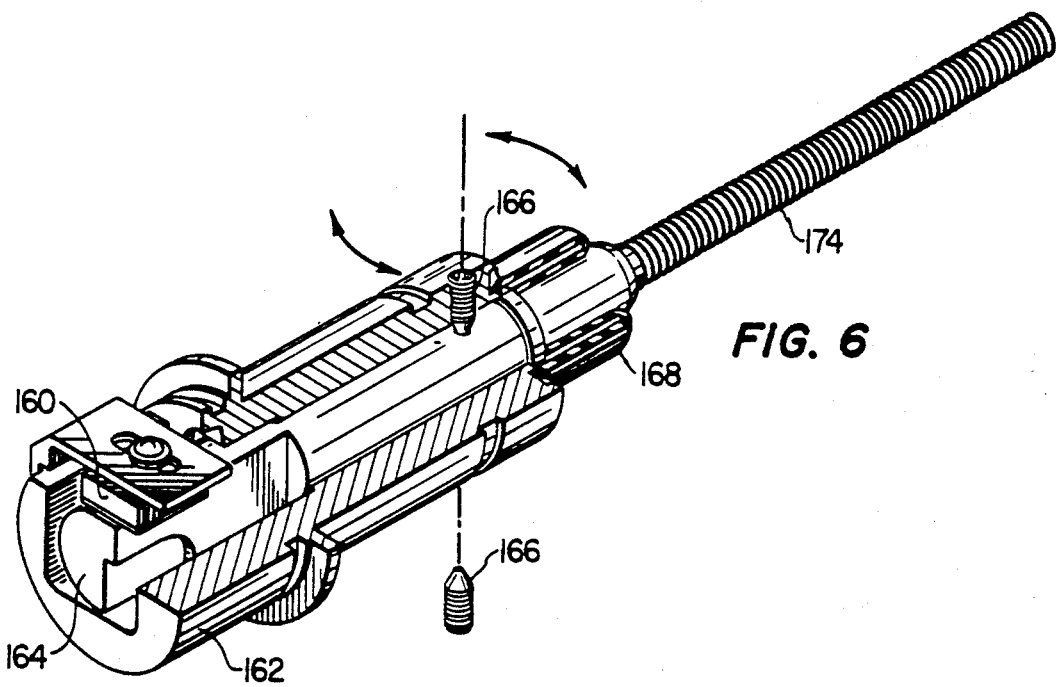
FIG. 6 is a detailed illustration of the vane and transducer for the flow responsive transmitter of the FIG. 5.

Referring to FIGS. 5 and 6, there is shown a pictorial illustration of a flow transmitter for generating a signal varying with measured flow to be applied to the amplifier 30 of FIG. 2. This measured flow signal is generated by a Hall effect transducer 160 mounted in a housing 162 that also supports a movable vane 164. The vane 164 is pivoted to the housing 162 on a pivot shaft 166 and extends from the housing through a diaphragm seal 168. Within the housing 162, the vane 164 terminates at the transducer 160 and is movable with reference thereto. Mounted to the vane 164 is a magnet (not shown) that cooperates with the transducer 160, such as a Hall effect element, to generate a signal on output lines varying with the rate of flow of a measured fluid.

It is well known that a signal generated in accordance with rate of flow by the mechanism so far described will be non-linear and some provision must be made to linearize the signal. Connected to the extension of the vane 164 from the housing 162 is a flexible element 174 in the shape of a tightly wound coil spring. This element extends into the fluid flow and imparts a motion to the vane 164 relative to the transducer 160 to produce a linear flow signal on the output lines. Further, the flexibility of the element 174 tends to smooth out the turbulent flow, such as found in vehicle mounted fluid flow systems. In operation, as the flow past the flexible element increases, the spring assumes an increasing bending profile, and it is this characteristic of the element 174 that provides the linearizing action for the signal on the output lines. Compared with electronic linearization, the tightly wound spring provides an economical and reliable linearization technique.

The housing 162 is enclosed within a case 176 having an upper cylindrical shaped portion 176a and a lower shroud 176b. The shroud 176b is provided with a passage in line with the fluid flow to balance the forces on the diaphragm 168 as the element 174 extends into the fluid path.

Mounted to the upper section 176a is a circuit amplifier 177 that receives the output of the transducer 160 and amplifies it for transmission to the circuit board 28 of FIG. 2 as received by the amplifier 30.

To complete the transmitter of FIG. 5, a cap or cover 178 is fitted over the upper part of the case 176 and includes the connecting lines 180 attached to the circuit board 28 of FIG. 2.

Figure 7:
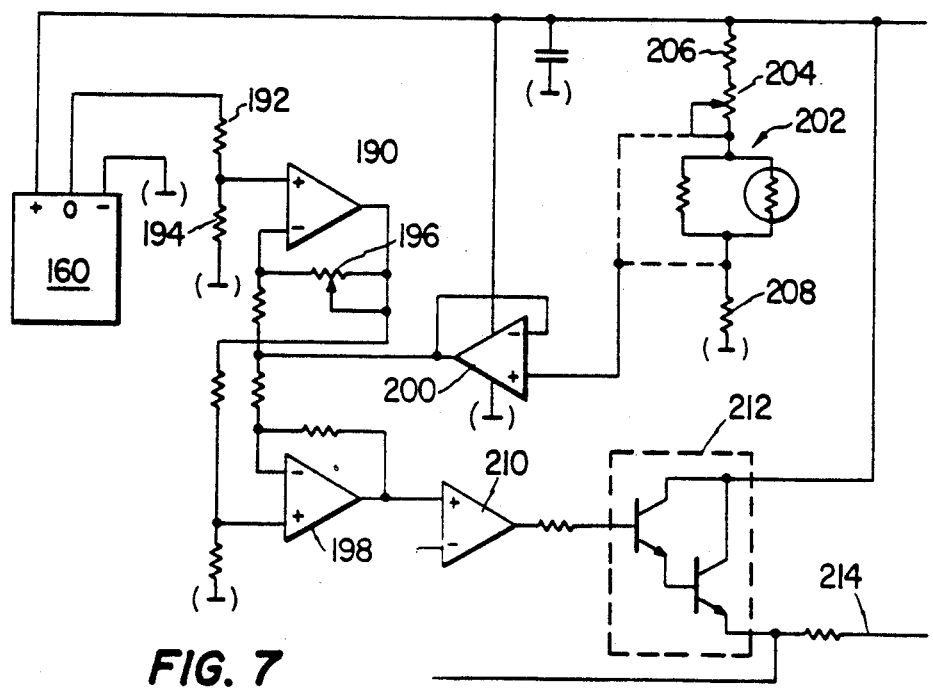
FIG. 7 is a schematic diagram of a circuit responding to the output of the transducer of FIG. 6 and generating a signal varying linearly with flow to be applied to the circuitry of FIG. 2.

Referring to FIG. 7, there is shown a schematic of the amplifier 177 for the flow indicator transmitter of FIGS. 5 and 6. The transducer 160, which as mentioned may be a Hall effect element, provides an output varying with movement of the vane 164 to the input of a gain amplifier 190 through a divider network consisting of resistors 192 and 194. The gain of the amplifier 190 is adjusted by means of a potentiometer 196 and the output is applied to one input of a differiential amplifier 198. A second input to the amplifier 198 is the output of a compensating circuit including an amplifier 200. The compensating circuit is connected to a zero adjust network including a thermistor circuit 202 in series with a potentiometer 204 and resistors 206 and 208.

An output of the amplifier 198, which is a signal varying with rate of flow and compensated by the output of amplifier 200, is applied to a driver amplifier 210 which drives an Darlington pair 212 as the output driver of the flow indicator transmitter of FIG. 7. Thus, in operation, as the rate of flow past the flexible element 174 varies the position of the vane 164 with reference to the transducer 160 causes the output of the transducer to vary linearly with the flow rate. This linear relationship between the output of the transducer 160 and the flow rate is the result of the flexible element 174 imparting a non-linear motion to the vane 164. This output of the transducer 160 is amplified by the circuit of FIG. 7 to produce a signal on a line 214 that varies with measured flow. This signal on the line 214 is applied to the input of the amplifier 30 of the circuit board 28 of FIG. 2.

Although the invention has been described and illustrated in detail, it is to be understood that the same is by way of illustration and example only, and is not to be taken by way of limitation. The spirit and scope of this invention are to be limited only by the terms of the appended claims.

I claim:
1. A flow responsive transmitter, comprising:
 a housing having an internal cavity;
 first means mounted in the cavity of said housing and extending therefrom into a flow stream, said first means including a vane at one end and a spring as an integral unit with said vane extending into the flow stream to flex in response to the flow stream and position said vane linearly with reference to the flow stream and effect a dampening of turbulent flow motion;
 flexible sealing means connected to said first means and said housing to seal the cavity from the flow stream; and
 a transducer mounted in said housing and responsive to the movement of said vane to generate a signal varying with measured flow, the movement of said vane with reference to said transducer provides a measured flow signal varying linearly with the rate of flow.
2. A flow responsive transmitter as set forth in claim 1 including an amplifier responsive to the signal varying with measured flow and having an output for transmission to a flow responsive indicator.
3. A flow responsive transmitter as set forth in claim 1 wherein said transducer includes a Hall effect element responsive to movement of said vane to generate the signal varying with measured flow.

* * * * *